United States Patent [19]

Matsuda et al.

[11] Patent Number: 4,905,478
[45] Date of Patent: Mar. 6, 1990

[54] AIR CONDITIONER FOR RAILWAY VEHICLES

[75] Inventors: Toshiharu Matsuda; Yoshinao Okumoto, both of Kudamatsu; Nobuyuki Fugiyama, Yamaguchi; Yoshichika Fukushima, Kudamatsu, all of Japan

[73] Assignee: Hitachi, Ltd., Tokyo, Japan

[21] Appl. No.: 386,038

[22] Filed: Jul. 25, 1989

Related U.S. Application Data

[63] Continuation of Ser. No. 185,426, Apr. 25, 1988, abandoned.

[30] Foreign Application Priority Data

Apr. 30, 1987 [JP] Japan .................... 62-104311
Aug. 12, 1987 [JP] Japan .................... 62-199750
Oct. 26, 1987 [JP] Japan .................... 62-268165

[51] Int. Cl.$^4$ ............................................. B60H 1/32
[52] U.S. Cl. ........................................ 62/244; 62/428; 62/DIG. 16
[58] Field of Search ................ 62/239, 244, DIG. 16, 62/428

[56] References Cited

U.S. PATENT DOCUMENTS

| | | | |
|---|---|---|---|
| Re. 26,160 | 2/1967 | Sorensen et al. | 62/428 X |
| 2,831,327 | 4/1958 | De Beaubein et al. | 62/244 |
| 2,887,856 | 5/1959 | Wile et al. | 415/178 X |
| 3,500,657 | 3/1970 | Johnson | 62/428 |
| 4,098,093 | 7/1978 | Czyl | 62/244 X |
| 4,201,064 | 5/1980 | Krug et al. | 62/244 X |
| 4,641,502 | 2/1987 | Aldrich et al. | 62/DIG. 16 |
| 4,727,728 | 3/1988 | Brown | 62/244 |

Primary Examiner—William E. Tapolcai
Attorney, Agent, or Firm—Antonelli, Terry & Wands

[57] ABSTRACT

A flat air conditioner for railway vehicle for installation on the roof of a vehicle is advantageous from the viewpoint of reducing air resistance to the vehicle and the design of the vehicle. The present invention provides such a vehicular air conditioner incorporating a horizontally longer compressor or compressors disposed with the longitudinal axes in a horizontal plane or disposed in a return air chamber to construct the air conditioner in a flat configuration with a small height and in a compact construction.

4 Claims, 6 Drawing Sheets

AIR CONDITIONER FOR RAILWAY VEHICLES

This application is a continuation of Ser. No. 07/185,426, filed Apr. 25, 1988, now abandoned.

BACKGROUND OF THE INVENTION

1. Field of the Invention

The present invention relates to an air conditioner for railway vehicles and, more particularly, to an air conditioner to be installed on the roof of a railway vehicle.

2. Description of the Prior Art

Japanese Utility Model Publication Nos. 59-7129, 60-10178 and 61-10178, Japanese Patent Provisional Publication (Kokai) No. 58-206417 and Japanese Utility Model Provisional Publication (Kokai) No. 59-120620 disclose air conditioners to be installed on the roof of a vehicle. These known air conditioners for railway vehicles have a disadvantage that the vertically higher construction of the compressor inevitably increases the height of the air conditioners. To eliminate such a disadvantage, there has been proposed an air conditioner for railway vehicles having a through hole in the bottom thereof to project the bottom portion of the compressor downward through the hole. In installing this air conditioner on the roof of a vehicle, the roof needs modification and a recess needs to be formed in the roof at a position corresponding to the bottom portion of the compressor.

Thus, it has been difficult to reduce the height of the conventional air conditioner because the conventional air conditioner incorporates a vertically higher compressor. Furthermore, the roof contour of a vehicle on which an air conditioner is to be installed needs to be formed in a special construction inevitably requiring an increase in time and labor in manufacturing the vehicle.

In addition, in the case of installing an air conditioner on an existing vehicle, it is advantageous that the air conditioner has a small height and requires the least modification of the roof of the vehicle because the air conditioner must be installed within the designated envelope of the vehicle.

SUMMARY OF THE INVENTION

Accordingly, it is an object of the present invention to provide a compact air conditioner having a comparatively small height.

In the present invention, a vehicular air conditioner comprises a condenser or condensers, a condenser fan for supplying air for the condenser(s), an evaporator or evaporators, an evaporator fan for supplying air to the evaporator, a pressure reducing mechanism, and a horizontally longer compressor.

BRIEF DESCRIPTION OF THE DRAWINGS

The above and other objects, and advantages of the present invention will become apparent from the following description taken with the accompanying drawings, in which.

DESCRIPTION OF THE PREFERRED EMBODIMENTS

Figure 1:
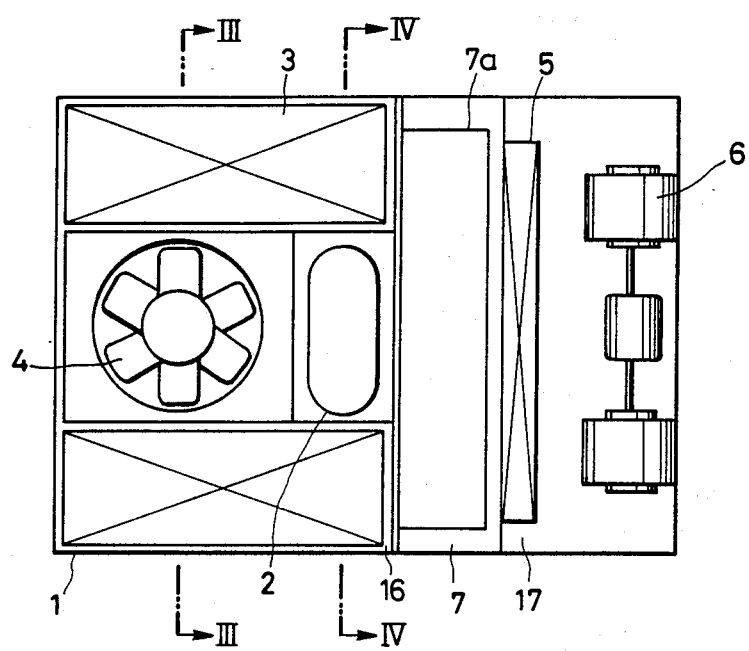
FIG. 1 is a plan view of an air conditioner, in a first embodiment, according to the present invention, in which the cover is removed.
Figure 2:
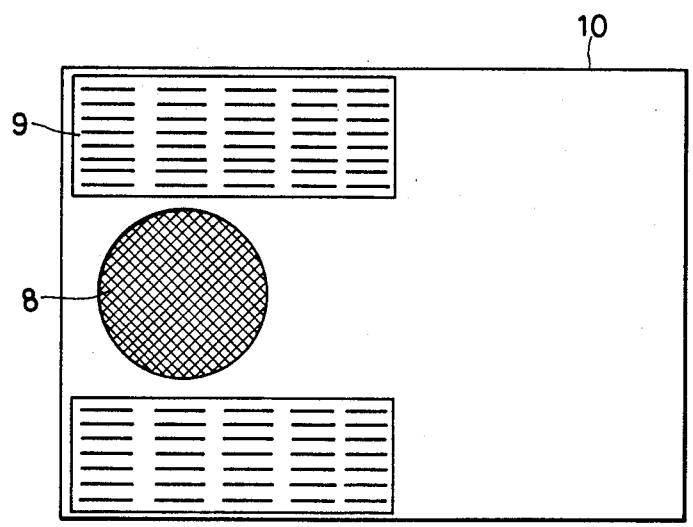
FIG. 2 is a plan view of the air conditioner of FIG. 1 provided with the cover.
Figure 3:
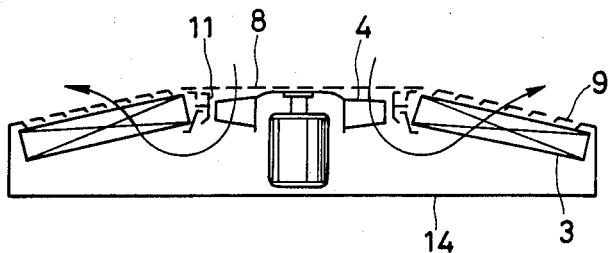
FIG. 3 is a sectional view taken on line III—III in FIG. 1.
Figure 4:
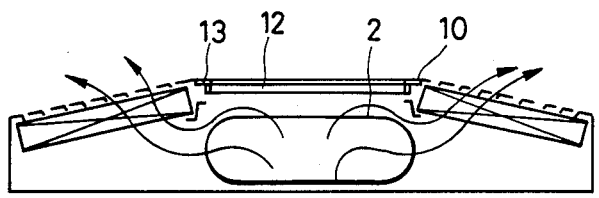
FIG. 4 is a sectional view taken on line IV—IV in FIG. 1.
Figure 5:
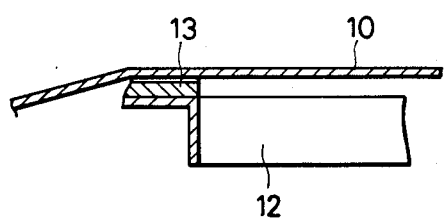
FIG. 5 is an enlarged fragmentary sectional view showing a packing and a packing seat shown in FIG. 4.
Figure 6:
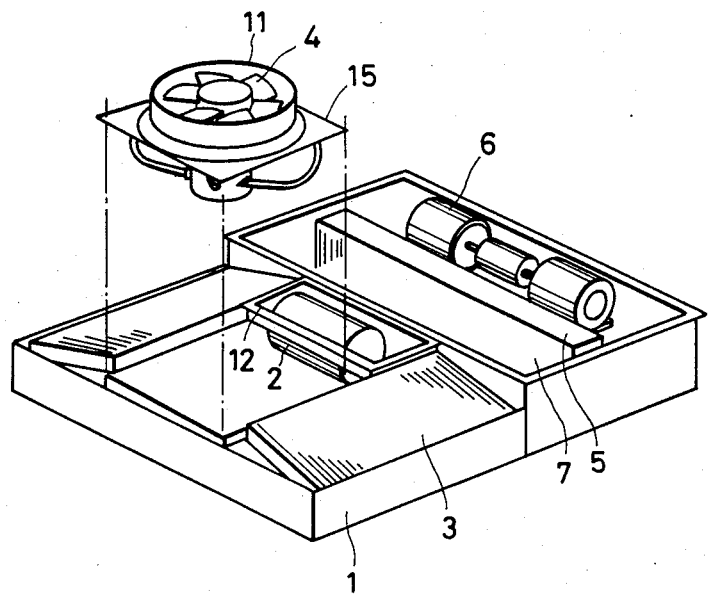
FIG. 6 is a perspective view of the air conditioner of FIG. 1.

An air conditioner, in a first embodiment, according to the present invention, will be described with reference to FIGS. 1 through 6.

Referring to FIGS. 1 through 6, there are shown an air conditioner 1 installed on the roof of a vehicle, a horizontally longer hermetic type compressor 2 disposed with its longitudinal axis in a direction across the running direction of the vehicle, namely, across the direction of the rails, condensers 3, a condenser cooling fan 4 for cooling the condenser 3, an evaporator 5, an evaporator fan 6 for sucking air through the evaporator 5 to supply conditioned air into the interior of the vehicle, a return air chamber 7 formed before the evaporator 5 in an air passage to supply return air from the interior of the vehicle to the evaporator 5 and communicating with the interior of the vehicle by means of a return opening 7a formed below the return air chamber 7, a cover 10 for entirely covering all the components of the air conditioner 1, a net 8 provided on the cover 10 to cover an intake of the condenser fan 4, grilles 9 provided on the cover 10 to exhaust condenser cooling air, an air guide 11 surrounding the condenser fan 4, a supporting member 15 supporting the air guide 11 and the motor for the condenser fan 4, a packing seat 12 disposed above the compressor 2, a packing 13 seated on the packing seat 12, a frame having an outside unit chamber 16 for containing the condensers 3, condenser fan 4 and the compressor 2, and an inside unit chamber 17 for containing the evaporator 5 and the evaporator fan 6, and having the return air chamber 7. The compressor 2 is a a hermetic type scroll compressor. The condensor fan 4, the motor or body for the condenser fan 4, the air guide 11 and the supporting member 15 are assembled in a single unit. Thus, the air conditioner 1 is divided into the outside unit chamber 16 and the inside unit chamber 17.

The operation of the air conditioner 1 will be described as follows. The compressor 2 supplies a high-temperature and high-pressure refrigerant to the condensers 3. The condenser fan 4 takes in air through the inlet covered with the net 8 into the outside unit chamber 16 and supplies the air to the condensers 3 to cool the condensers 3. The air which has absorbed heat from the condensers 3 is exhausted through the grills 9. The compressor 2 also is cooled by the air taken into the condenser fan 4. The refrigerant cooled and condensed in the condensers 3 is supplied through a pressure reducing mechanism, not shown, to the evaporator 5. The return air from the interior of the vehicle is cooled by the evaporator 5, and then conditioned air is supplied into the interior of the vehicle by the evaporator fan 6.

The effects of the air conditioner 1 will be described as follows. Since the copmressor 2 has a horizontally longer construction, the height, namely, the vertical size, of the compressor 2 is comparatively small. Accordingly, the height of the air conditioner 1 is comparatively small. That is, the air conditioner 1 can be formed in a flat construction. Since the compressor 2 is disposed with the longitudinal axis in a direction across the rails, the compressor 2 can be disposed near the condenser cooling fan 4 without wasting space. Therefore the space is used efficiently for arranging the components. Particularly, the arrangement of the condenser fan 4 and the compressor 2 between the condesners 3 enables the efficient use of the outside unit chamber 16 for arranging the components. Furthermore, the compressor 2 is cooled by the air of the condenser fan 4 and hence the compressor 2 is free from troubles attributable to heat and no special means for cooling the compressor 2, for example, a compressor cooling fan, is necessary.

The air guide 11 improves the performance of the condenser fan 4 and hence the condenser fan 4 may be a fan having a small capacity, namely, a fan having a comparatively small diameter and a comparatively small height, which is advantageous for constructing the air conditioner 1 in a compact construction.

The packing 13 seated on the packing seat 12 prevents the air taken into the outside unit chamber 16 by the condenser fan 4 from escaping through a gap above the compressor 2. That is, the gap is sealed with the packing 13 seated on the packing seat 12 when the cover 10 is put on the air conditioner 1. Thus, the air taken into the outside unit chamber 16 is used effectively for cooling the compressor 2 and the condensers 3.

Furthermore, the disposition of the compressor 2 and the condenser fan 4 between the condensers 3 enables forming the outside unit chamber 16 and the inside unit chamber 17 respectively in rectangular shapes. Accordingly, the outside unit chamber 16 and the inside unit chamber 17 can be formed respectively in compact constructions, and hence the air conditioner 1 can be formed in a compact construction and can easily be manufactured. Still further, since the compressor 2 is disposed with the longitudinal axis across the rails, the lubricant contained in the compressor will not collect in one side of the compressor 2 in accelerating or decelerating of the vehicle, so that insufficient lubrication attributable to the collection of the lubricant in one side of the compressor 2 is prevented.

In this embodiment air flow was described from condenser fan 4 to condenser 3, however air flow is not limited to this flow. Reverse air flow of the description is also considered as a part of this invention.

Figure 7:
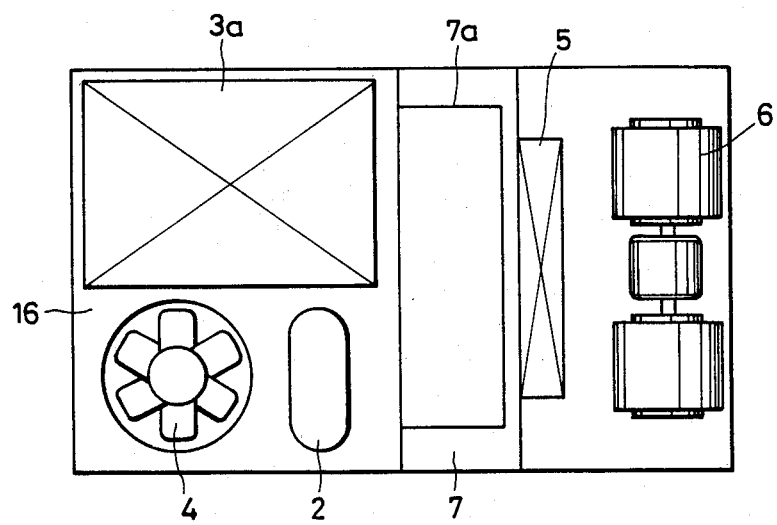
FIG. 7 is a plan view of the air conditioner, in a second embodiment, according to the present invention.

An air conditioner, in a second embodiment, according to the present invention will be described with reference to FIG. 7. This air conditioner is substantially the same as the air conditioner 1 in the first embodiment except that a single condenser 3a corresponding to the two condensers 3 of the first embodiment is disposed in one side of an outside unit chamber 16, and a compressor 2 and a condenser cooling fan 4 are disposed in the other side of the outside unit chamber 16.

The configuration of the air conditioner in the second embodiment requires less parts than the air conditioner in the first embodiment, simplifies work for installing the condenser 3a and the piping.

Figure 8:
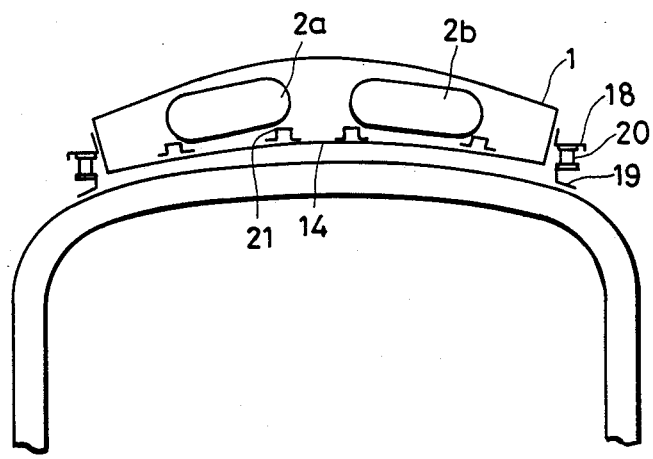
FIG. 8 is a schematic fragmentary sectional view showing the disposition of compressors incorporated into an air conditioner, in a third embodiment, according to the present invention.

An air conditioner, in a third embodiment, according to the present invention will be described with reference to FIG. 8. This air conditioner 1 has two refrigerating systems respectively including horizontally longer compressors 2a and 2b disposed with their longitudinal axes substantially in a direction across the rails and tilted in conformity to the contour of the roof of a vehicle on the bottom plate 14 of a frame, curved in conformity to the contour of the roof of the vehicle. Accordingly, the height of the air conditioner 1 from the surface of the roof is comparatively small when the air conditioner 1 is installed on the roof of the vehicle. The compressors 2a and 2b are installed to supporting members 21 provided on the bottom plate 14 of the frame. Brackets 18 are fixed to the frame of the air conditioner 1. The backets 18 are joined through vibration isolating rubber pads 20 to supports 19 fixed to the roof of the vehicle.

Figure 9:
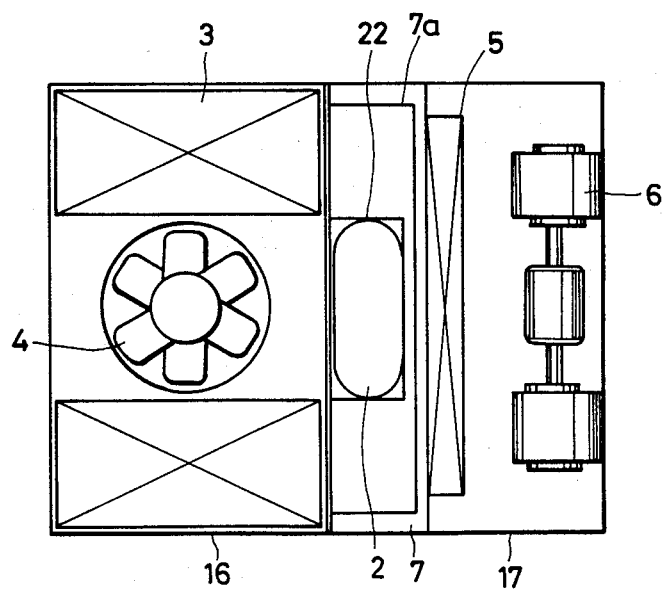
FIG. 9 is a plan view of an air conditioner, in a fourth embodiment, according to the present invention.

An air conditioner, in a fourth embodiment, according to the present invention will be described with reference to FIG. 9. This air conditioner 1 has a compressor 2 disposed within a return air chamber 7 formed in an inside unit chamber 17, a condenser cooling fan 4 disposed at the center of an outside unit chamber 16, and two condensers 3 disposed on opposite sides of the condenser cooling fan 4. Accordingly, the condenser fan 4 is able to flow air uniformly through the condensers 3 for more efficient heat exchange. The compressor 2 can be disposed within the return air chamber 7 of the inside unit chamber 17 without requiring any additional space. Accordingly, the condensers 3 are formed in a length, namely, a size along the direction of the rails, corresponding to the diameter of the condenser fan 4 and in an increased width, namely, a size across the direction of the rails to construct the air conditioner 1 in a compact construction. Since the area of a return opening 7a formed in the bottom of the return air chamber 7 is large as compared with an area occupied by the compressor 2, the flow of return air through the return opening 7a is not blocked bay the compressor 2. In this air conditioner 1, the compressor 2 is cooled by the return air and hence no compressor cooling means such as a compressor cooling fan is necessary.

Figure 10:
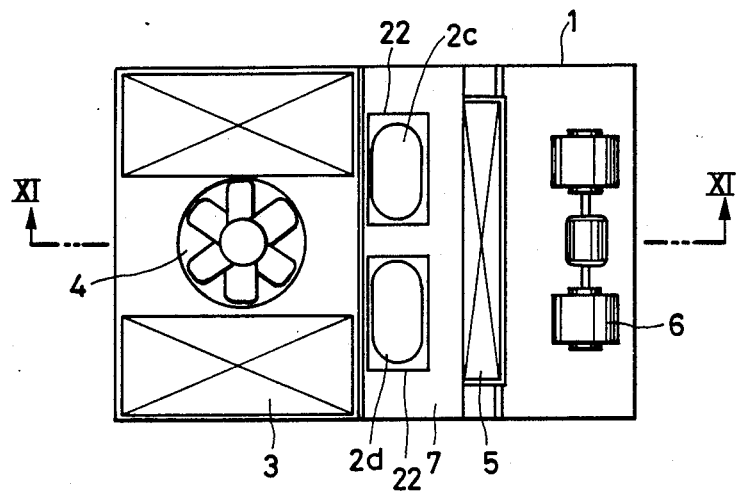
FIG. 10 is a plan view of an air conditioner, in a fifth embodiment, according to the present invention.
Figure 11:
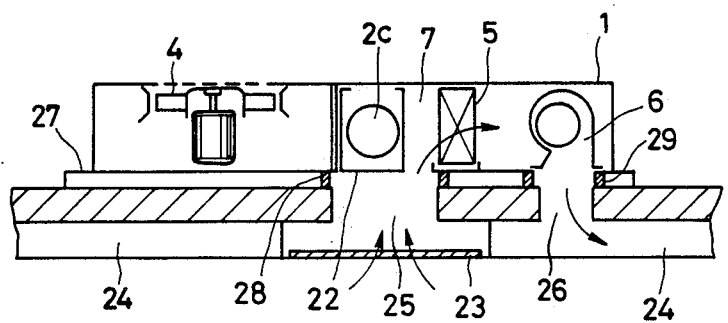
FIG. 11 is a sectional view taken on line XI—XI in FIG. 10, showing the air conditioner of FIG. 10 installed on the roof of a vehicle.

An air conditioner, in a fifth embodiment, according to the present invention will be described with reference to FIGS. 10 and 11.

This air conditioner 1 has two compressors 2c and 2d supported respectively on support members 22 in a return air chamber 7 formed in an inside unit chamber 16. A filter 23 is provided over a return air inlet. Return air flows through an inlet opening 25 formed in the roof of a vehicle after being filtered by the filter 23 and reaches a return air chamber 7. Conditioned air supplied by an evaporation fan 6 flows through an outlet opening 26 formed in the roof of the vehicle into and is distributed to the interior of the vehicle by a duct 24 provided within the interior of the vehicle. A packing 28 is provided between the inlet opening 25 and the return air chamber 7. A packing 29 is provided between the outlet of the evaporation fan 6 and the outlet opening 26. A base frame 27 for supporting the air conditioner 1 on the roof of the vehicle has a size corresponding to the bottom size of the air conditioner 1 and is fixed to the roof of the vehicle, so that the weight of the air conditioner 1 is distributed over a wide area on the roof of the vehicle, and hence the roof need not be reinforced additionally.

The constitution of this air conditioner 1 is particularly advantageous in installing the air conditioner 1 on the roof of an existing vehicle. The air conditioner 1 can simply be installed on the roof of an existing vehicle by forming the inlet opening 25 and the outlet opening in the roof, attaching the packings 28 and 29 to the roof respectively around the inlet opening 25 and the outlet opening 26, and simply mounting the air conditioner 1 on the roof without requiring any adjustment work for mounting the air conditioner 1 directly to the roof of the vehicle.

Figure 12:
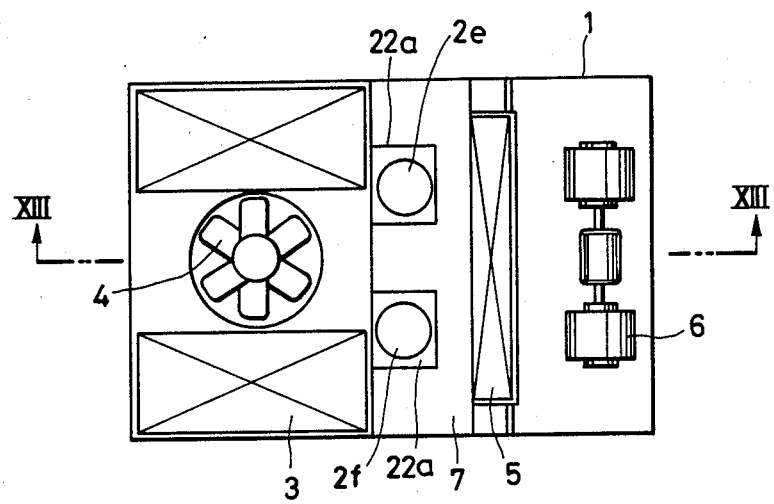
FIG. 12 is a plan view of an air conditioner, in a sixth embodiment, according to the present invention.
Figure 13:
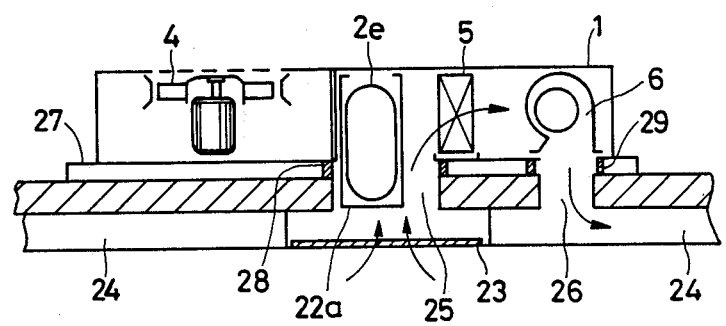
FIG. 13 is a sectional view taken on line XIII—XIII in FIG. 12, showing the air conditioner of FIG. 12 installed on the roof of a vehicle.

An air conditioner, in a sixth embodiment, according to the present invention will be described with reference to FIGS. 12 and 13.

The sixth embodiment is substantially the same in constitution and in the manner of installation as the fifth embodiment, except that the air conditioner in the sixth embodiment has two vertically higher compressors 2e and 2f. The compressors 2e and 2f are supported respectively by supporting members 22a with the respective bottom portions thereof projecting downward through an inlet opening 25 formed in the roof of a vehicle. Accordingly, the height of the air conditioner 1 is not dependent on the vertical size of the compressors 2e and 2f and height of the top of the air conditioner 1 installed on the roof from the surface of the roof is comparatively small.

Although the foregoing air conditioners embodying the present invention have been described as applied to cooling, the air conditioers may be of a heat pump type capable of cooling and heating.

Thus, the air conditioners according to the present invention have a comparatively small height and a compact construction.

What is claimed is:

1. An air conditioner for railway vehicles to be arranged on their roofs comprising:

two condensers having a space below each condenser serving as an air flow passage and being installed obliquely with respect to a horizontal plane such that their outer ends in a width direction of the air conditioner are lower than their inner ends in respect to the horizontal plane;

a condenser fan arranged between said two condensers at a position adjacent to the upper ends of said condensers, said condenser fan comprising an axial flow fan for sucking air from an upper portion of the air conditioner to supply the air to the condensers through said space for air flow passage;

a compressor installed between said two condensers adjacent to said condenser fan and at a lower position than the upper ends of said condensers, said compressor being elongated in a lateral direction of the air conditioner;

an evaporator;

an evaporator fan for supplying return air to said evaporator; and a pressure reducing mechanism.

2. An air conditioner for railway vehicles according to claim 1, wherein said compressor is arranged in the air flow passage for air supplied from the condenser fan to the condensers.

3. An air conditioner for railway vehicles according to claim 1, wherein said condenser fan is integrally constructed with a fan guide, a condenser fan body, and a support member for supporting said fan guide, and said condenser fan body.

4. An air conditioner for railway vehicles to be arranged on their roofs comprising an outside unit chamber for accommodating two condensers having a space below each condenser serving as an air flow passage and being installed obliquely with respect to a horizontal plane such that their outer ends in a width direction of the air conditioner are lower than their inner ends in respect to the horizontal plane, and a condenser fan arranged between said two condensers at a position lower than the upper ends of said condensers, said condenser fan comprising an axial flow fan for sucking air from an upper portion to supply the air to the condensers; and a compressor installed between said two condensers adjacent to said condenser fan, at a lower position than the upper ends if said condensers, said compressor being elongated in a lateral direction of the air conditioner; and an inside unit chamber for accommodating an evaporator and an evaporator fan for supplying a return air to said evaporator;

said outside unit chamber and said inside unit chamber having their respective one sides coincided in substantially the same plane.

* * * * *